(12) United States Patent
Derrick et al.

(10) Patent No.: US 6,345,356 B1
(45) Date of Patent: Feb. 5, 2002

(54) METHOD AND APPARATUS FOR SOFTWARE-BASED DISPATCH STALL MECHANISM FOR SCOREBOARDED IOPS

(75) Inventors: John Edward Derrick, Round Rock; Lee Evan Eisen, Austin; Hung Qui Le, Austin; Robert Greg McDonald, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/354,498

(22) Filed: Jul. 16, 1999

(51) Int. Cl.[7] ............................................. G06F 9/312
(52) U.S. Cl. ...................... 712/216; 712/217; 712/225
(58) Field of Search ................................ 712/216, 217, 712/225

(56) References Cited

U.S. PATENT DOCUMENTS

| | | | | |
|---|---|---|---|---|
| 5,440,703 A | * | 8/1995 | Ray et al. | 712/228 |
| 5,481,693 A | * | 1/1996 | Blomgren et al. | 712/225 |
| 5,606,696 A | * | 2/1997 | Ackerman et al. | 709/108 |
| 5,721,867 A | * | 2/1998 | Kuttanna et al. | 711/141 |
| 6,070,238 A | * | 5/2000 | Feiste et al. | 712/217 |
| 6,128,722 A | * | 10/2000 | Fry et al. | 712/23 |

\* cited by examiner

*Primary Examiner*—William M. Treat
(74) *Attorney, Agent, or Firm*—Anthony V. S. England; Bracewell & Patterson, L.L.P.

(57) ABSTRACT

A dummy instruction is issued, followed by several groups of No Operations (NOPs). The instruction sequencer unit (ISU) detects the dummy instruction and stalls the pipeline until the scoreboard indicates the XER count is valid. After a read from a scoreboarded Special Purpose Register (SPR), No Operation—Internal Operations (NOP—IOPs) are inserted between write and read SPR IOPs to allow an ISU scoreboard mechanism to be activated before being tested by a read SPR IOP. A read-write-read sequence is utilized: a dummy read of the string count field from a scoreboarded SPR, writing that value back to the same SPR and then performing a read of the SPR once again. A predetermined number of dummy IOPs follow the initial dummy read to prevent the value of the string count field from being read too soon.

18 Claims, 5 Drawing Sheets

METHOD AND APPARATUS FOR SOFTWARE-BASED DISPATCH STALL MECHANISM FOR SCOREBOARDED IOPS

RELATED APPLICATIONS

The present application is related to the subject matter of the following applications: Ser. No. 09/363,464 (Docket No. AT9-98-945) entitled "Compressed String and Multiple Generation Engine" and filed Jul. 29, 1999; Ser. No. 09/263,667 (Docket No. AT9-98-525) entitled "An Instruction Buffer Arrangement for a Superscalar Processor" and filed Mar. 5, 1999; Ser. No. 09/345,161 (Docket No. AT9-98-939) entitled "Method and Apparatus for Modifying Instruction Operations in a Processor" and filed Jun. 29, 1999; and Ser. No. 09/363,463 (Docket No. AT9-98-948) entitled "XER Scoreboard Mechanism" and filed Jul. 29, 1999. The content of the above-referenced applications is incorporated herein by reference.

BACKGROUND OF THE INVENTION

1. Technical Field

The present invention relates in general to data processing systems and in particular to a processor in a data processing system. More particularly, the present invention relates to scoreboarded special purpose registers on board the processor.

2. Description of the Related Art

Reduced instruction set computer ("RISC") processors are employed in many data processing systems and are generally characterized by high throughput of instructions. RISC processors usually operate at a high clock frequency and because of the minimal instruction set do so very efficiently. In addition to high clock speed, processor efficiency is improved even more by the inclusion of multiple execution units allowing the execution of two, and sometimes more, instructions per clock cycle.

As used herein, "clock cycle" refers to an interval of time accorded to various stages of an instruction processing pipeline within the processor. Storage devices (e.g. registers and arrays) capture their values according to the clock cycle. The storage device then stores the value until the subsequent rising or falling edge of the clock signal, respectively.

Processors with the ability to execute multiple instructions per clock cycle are described as "superscalar." Superscalar processors, such as the PowerPC™ family of processors available from IBM Corporation of Armonk, N.Y., provide simultaneous dispatch of multiple instructions. Included in the processor are an Instruction Cache (IC), an Instruction Dispatch Unit (IDU), an Execution Unit (EU), an Instruction Sequencer Unit (ISU) and a Completion Unit (CU). Generally, a superscalar, RISC processor is "pipelined," meaning that a second instruction is waiting to enter the execution unit as soon as the previous instruction is finished.

Generally a pipeline comprises a plurality of pipeline stages. Each pipeline stage is configured to perform an operation assigned to that stage upon a value while other pipeline stages independently operate upon other values. When a value exits the pipeline, the function employed as the sum of the operations of each pipeline stage is complete. In a pipelined superscalar processor, instruction processing is usually accomplished in six stages—fetch, decode, dispatch, execute, writeback and completion stages.

The fetch stage is primarily responsible for fetching instructions from the instruction cache and determining the address of the next instruction to be fetched. The decode stage generally handles all time-critical instruction decoding for instructions in the instruction buffer. The dispatch stage is responsible for non-time-critical decoding of instructions supplied by the decode stage and for determining which of the instructions can be dispatched in the current cycle. A typical RISC instruction set (for PowerPC™) contains three broad categories of instructions: branch instructions (including specific branching instructions, system calls and Condition Register logical instructions); fixed point instructions and floating point instructions. Each group is executed by an appropriate function unit.

The execute stage executes the instruction selected in the dispatch stage, which may come from the reservation stations or from instructions arriving from dispatch. The completion stage maintains the correct architectural machine state by considering instructions residing in the completion buffer and utilizes information about the status of instructions provided by the execute stage. The write back stage is used to write back any information from the rename buffers that is not written back by the completion stage.

All pipelined instructions pass through an issue stage sequentially, but enter different pipeline stages so instructions may be stalled or out of order for proper execution. Utilizing scoreboard controls is a technique for resolving register access conflicts in a pipelined computer. Each potential dependency is recorded as a single bit, set when a register source operand is decoded and another single bit set when a register destination operand is decoded. The use of a register for fetching an operand is stalled if that register is indicated as the destination for a decoded but not yet executed instruction.

Scoreboard controls are often implemented because there are registers which are not renamed that could potentially be written to out of order or read from before they had been properly updated by a write operation. Also, register renaming may not be appropriate because of the complexity of the renaming scheme and the physical cost in processor area and timing of the rename hardware. In a microcode expansion unit, which uses data from various scoreboarded registers (such as the Integer Exception Register (XER) or Special Purpose Registers (SPR)), utilizing scoreboard controls prior to or during action by a microcode expansion unit is undesirable. It is undesirable to implement such a mechanism due to the complexity and potential timing impact on critical path circuitry.

X-form string instructions, which utilize the string count field of the XER to determine how many bytes are to be loaded or stored, require the XER to determine the count of generating instructions from microcode (Ucode). The string count field of the XER is not renamed and the instruction sequence generated by the Ucode unit is many pipe stages earlier. Because of this, the Ucode unit and the Instruction Sequencer Unit (ISU) must determine that no Internal Operation (IOP) that may trigger the ISU's XER scoreboard is in flight between the IDU and the ISU. Also, if the ISU's XER scoreboard is active, the IDU must be stalled. The Ucode generation for the string instruction must wait until the correct XER value is sent to the IDU or the registers that have not been renamed could be potentially written to out-of-order. If scoreboard controls are used in a microcode expansion unit the timing impact on critical path circuitry is significant.

It would be desirable therefore, to improve performance of microcode implementation of string instructions requiring count data in a superscalar processor without utilizing scoreboard controls prior to or during microcode expansion unit operation.

SUMMARY OF THE INVENTION

It is therefore one object of the present invention to provide a method and apparatus such that proper ordering of register reads and writes is enforced.

It is another object of the present invention to provide a method and system that will utilize an existing scoreboard function to stall the pipeline until an XER count is confirmed valid.

It is yet another object of the present invention to provide a method and apparatus that will test the existing scoreboard and maintain separation between testing and executing an instruction.

The foregoing objects are achieved as is now described. A dummy instruction, "mfXER" (move from integer exception register), is issued. An instruction sequencer unit (ISU) detects the mfXER instruction and stalls the pipeline until the scoreboard indicates the XER count is valid. No Operation—Internal Operations (NOP—IOPs) are inserted between write and read SPR IOPs to allow an ISU scoreboard mechanism to be activated before being tested by the read SPR IOP. A dummy read of the string count field or a predetermined scoreboarded SPR, is employed to read from a scoreboarded SPR. A predetermined number of dummy IOPs follow the initial dummy read to prevent the broadcast value of the string count field from being sampled. Further, a non-functional or "reserve from normal use" SPR, which may be written to and then read from, will implement the same function.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
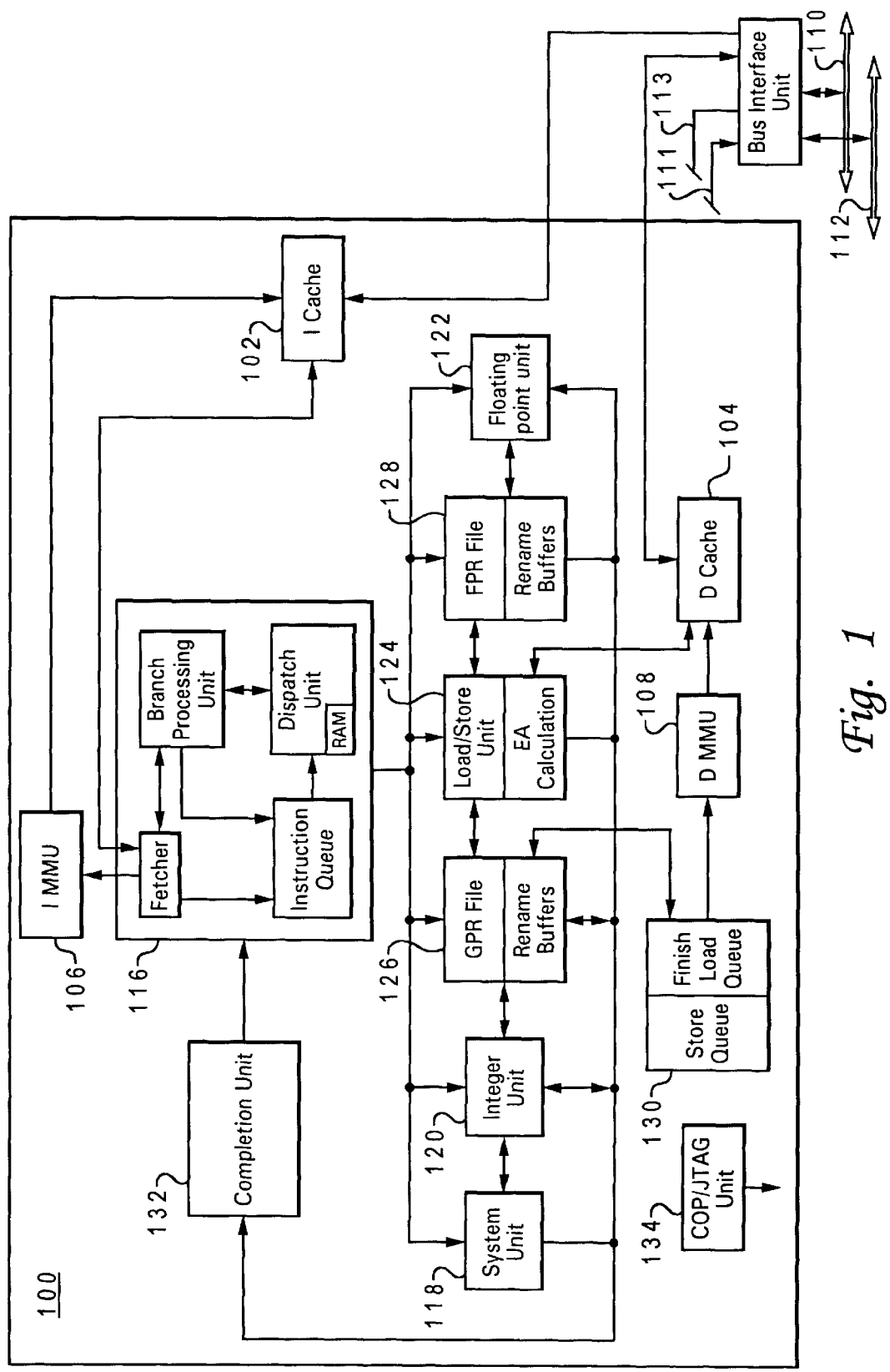
FIG. 1 depicts a block diagram of a processor and related portions of a data processing system by which a preferred embodiment of the present invention may be implemented.

With reference now to the figures, and in particular with reference to FIG. 1, a block diagram of a processor and related portions of a data processing system in which a preferred embodiment of the present invention may be implemented, is depicted. Processor 100 is a single integrated circuit superscalar processor, such as the PowerPC™ processor available from IBM Corporation of Armonk, N.Y. Accordingly, processor 100 includes various units, registers, buffers, memories, and other sections, all of which are formed by integrated circuitry. Processor 100 also operates according to reduced instruction set computing ("RISC") techniques.

Processor 100 includes level one (L1) instruction and data caches ("I Cache" and "D Cache") 102 and 104, respectively, each having an associated memory management unit ("I MMU" and "D MMU") 106 and 108. As shown in FIG. 1, processor 100 is connected to system address bus 110 and to system data bus 112 via bus interface unit 114. Instructions are retrieved from system memory (not shown) to processor 100 through bus interface unit 114 and are stored in instruction cache 102, while data retrieved through bus interface unit 114 is stored in data cache 104. A typical RISC instruction set (PowerPC™) contains three broad categories of instructions: branch instructions (including specific branching instructions, system calls and Condition Register logical instructions); fixed point instructions and floating point instructions. Each group is executed by an appropriate function unit. Instructions are fetched as needed from instruction cache 102 by instruction unit 116, which includes instruction fetch logic, instruction branch prediction logic, an instruction queue and dispatch unit.

The dispatch unit within instruction unit 116 dispatches instructions as appropriate to execution units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128.

Load/store unit 124 loads instruction operands from data cache 104 into integer registers 126 or floating point registers 128 as needed, and stores instructions' results when available from integer or floating point registers 126 or 128 into data cache 104. Load and store queues 130 are utilized for these transfers from data cache 104 to and from integer or floating point registers 126 or 128. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor (COP) and joint test action group (JTAG) unit 134 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. All such variations are within the spirit and scope of the present invention.

Figure 2:
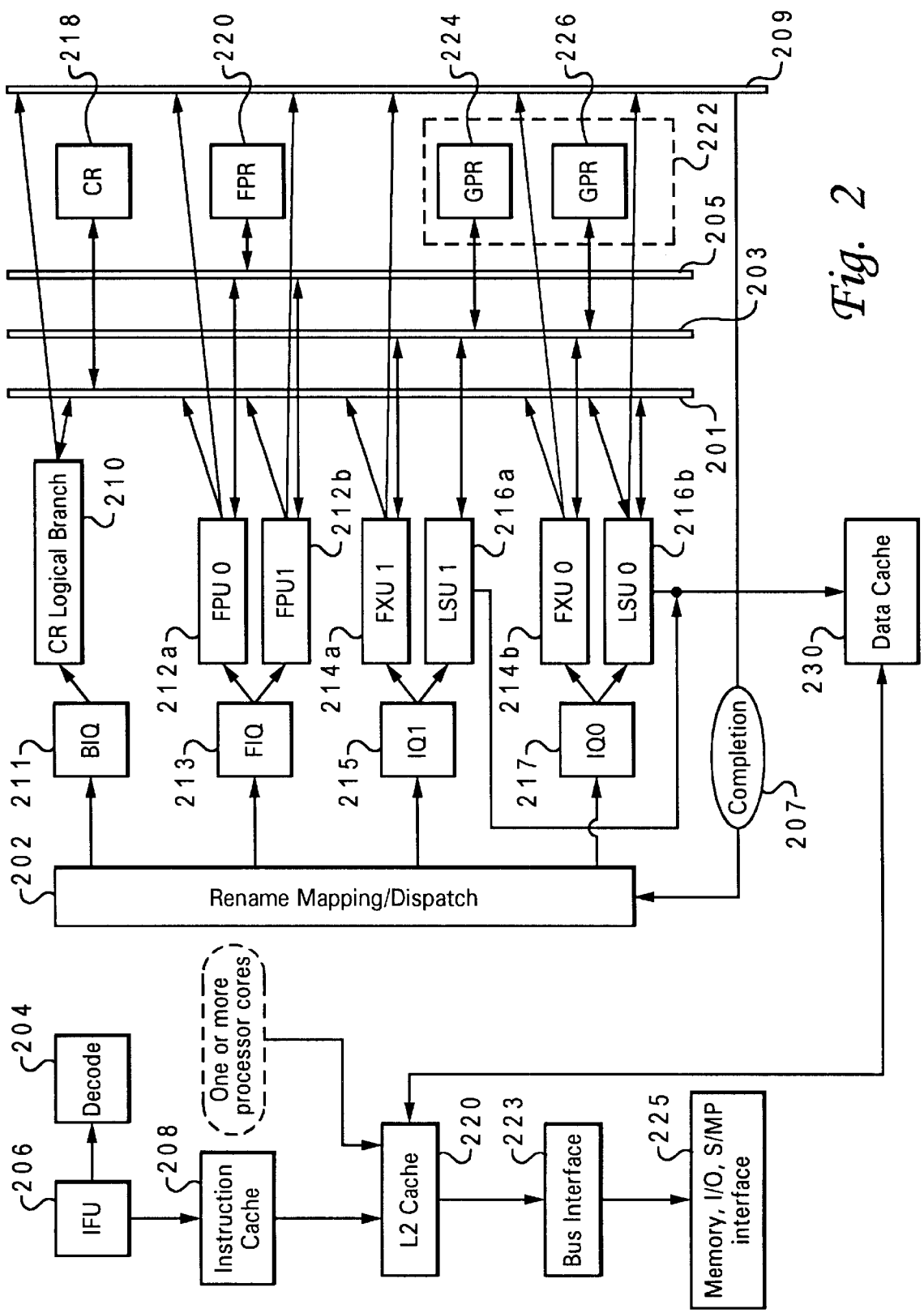
FIG. 2 is a high-level block diagram of a superscalar processor in accordance with the present invention.

Referring to FIG. 2, a block diagram of a superscalar processor in accordance with a preferred embodiment of the present invention, is depicted. To index instructions properly as instructions become wider in complex processors, it is important to optimize the translation from the complex instruction set with a large amount of implicit information to an explicit instruction set that does not require the use of architected registers. It is sometimes important to decompose or translate those instructions into two or more instructions that may not have a direct relationship to the original instruction to allow for faster execution of such instructions.

Processor 200 includes instruction fetch unit (IFU) 206 which provides signals to decode unit 204 which utilizes rename mapping structure 202. Rename mapping structure 202 provides information directly to issue queues 211–217. The issue queues 211, 213, 215 and 217 in turn feed execution units 210, 212a–b, 214a–b, and 216a–b.

Instruction cache 208 stores instructions received from IFU 206. Data cache 230 receives data from execution units 210–216. Level 2 (L2) cache 220 is utilized to store data and instructions from data cache 230 and instruction cache 208. Processor 200 includes bus interface unit (BIU) 223 which passes information between L2 cache 220 and peripheral device interface 225 (i.e., memory, i/o device, mp).

In this embodiment, branch issue queue (BIQ) 211 provides information to condition register (CR) 218 or branch unit 210. The floating point issue queue (FIQ) 213 provides information to floating point units (FPUs) 212a and 212b. Issue queue (IQ) 215 provides information to fixed point unit (FXU) 214a and load/store unit (LSU) 216. IQ 217 provides information to FXU 214b and LSU 216b. Although the issue queues are arranged in the above-identified manner, one of ordinary skill in the art readily recognizes, that the issue queues can be arranged in a different manner and that arrangement would be within the spirit and scope of the present invention.

Conditional register 218 provides and receives information from CR bus 201. Floating point architectural registers (FPR) 220 provide and receive information from FPR bus 205. General purpose registers (GPR) 224 and 226 provide and receive information from GPR bus 203. Completion unit 207 provides information to rename mapping 202 via completion bus 209.

Branch unit 210 provides and receives information via CR bus 201 utilizing, in a preferred embodiment, conditional registers 0–7 (CR 0–7). FPU 212a and FPU 212b provides information to CR 218 via CR bus 201, utilizing in a preferred embodiment conditional register 1 CR1. FPU 212a and 212b also receive and provide information from and to FPR pool 220 via FPR bus 205. FXU 214a, FXU 214b, LSU 216a, LSU 216b output results to CR 218 via CR bus 201, utilizing in a preferred embodiment, conditional register 0 CR0. FXU 214a, FXU 246, LSU 216a and LSU 216b also receive and provide information from and to GPR pool 222 via GPR bus 203. GPR pool 222 in a preferred embodiment is implemented utilizing a shadow GPR arrangement in which there are two GPRs 224 and 226. All of the execution units 210–216 provide results to completion unit 207 via completion bus 209.

Figure 3:
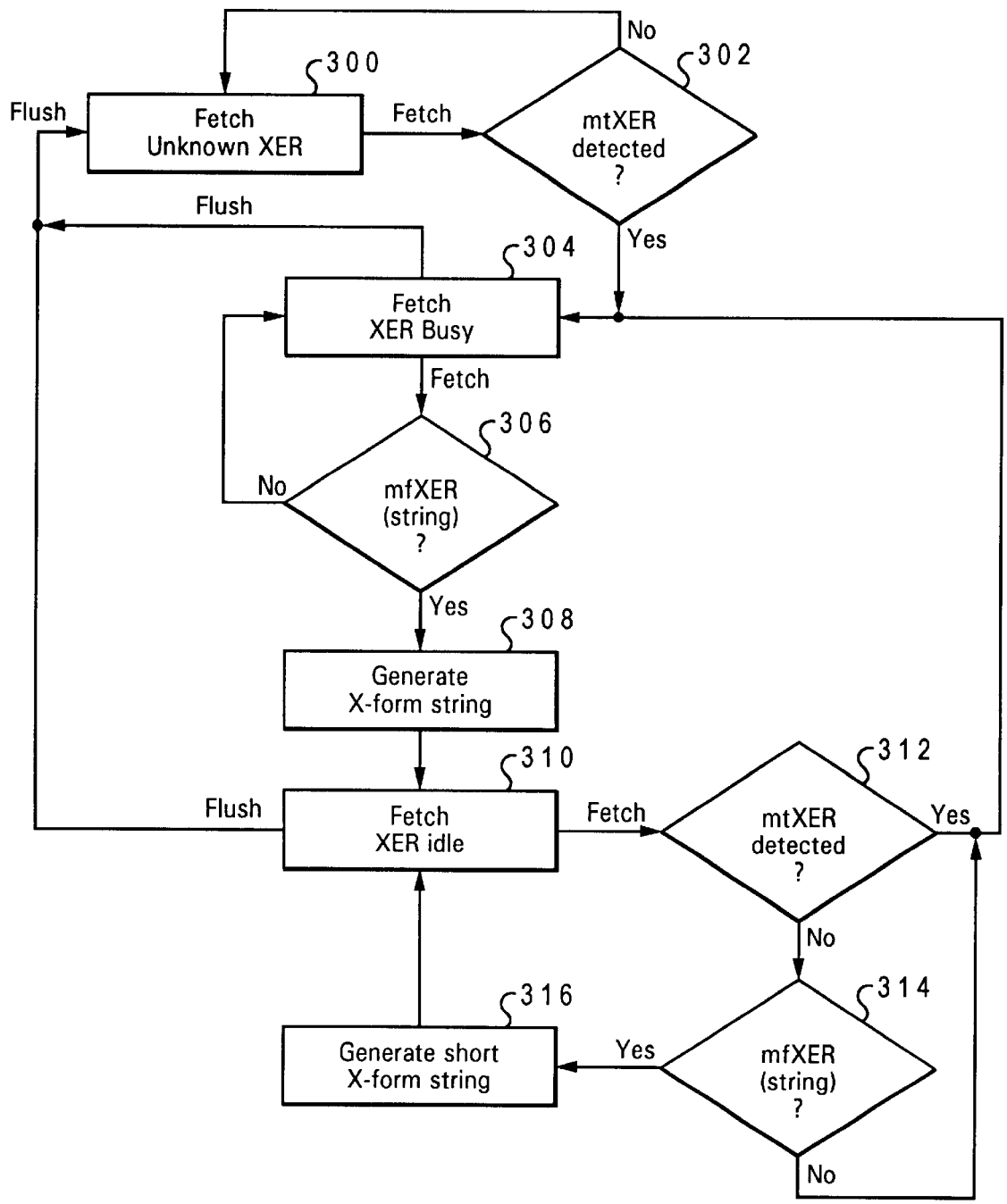
FIG. 3 illustrates a high-level flow diagram of a scoreboard state machine in accordance with the present invention.

Referring now to FIG. 3, a high-level flow diagram of a scoreboard state machine in accordance with the present invention, is illustrated. The state machine is shown as being reset into an unknown XER state 300. The process moves to step 302, which depicts a determination of whether a "move to XER" (mtXER) instruction is detected as being decoded. If no mtXER is detected as being decoded, the process repeats step 300. If a mtXER instruction is detected as being decoded, the process moves to step 304, which illustrates the state machine changing to XER busy state. The process then proceeds to step 306, which depicts a determination of whether a "read from XER" (mfXER) is detected. If a mfXER is not detected, the process continues to step 304 and repeats. If a mfXER is detected the process instead passes to step 308, which illustrates an X-form string being generated by the state machine. The state machine maintains XER busy state until a mfXER is detected and successfully dispatched. When a mfXER is detected and successfully dispatched the process proceeds to step 310, which depicts the state machine transitioning to an idle state.

The process then passes to step 312, which depicts a determination of whether a mtXER is detected. If a mtxer is detected, the process returns to step 304 and repeats. If a mtXER is not detected, the process instead passes to step 314, which illustrates a determination of whether a mfXER is detected. If a mfXER is not detected, the process returns to step 304 and repeats. If a mfXER is detected, the process instead proceeds to step 314, which depicts the state machine generating a short X-form string. The process continues to step 310, which illustrates the state machine returning to an idle state. The process then passes to step 300, where the state machine enters an unknown state.

Figure 4:
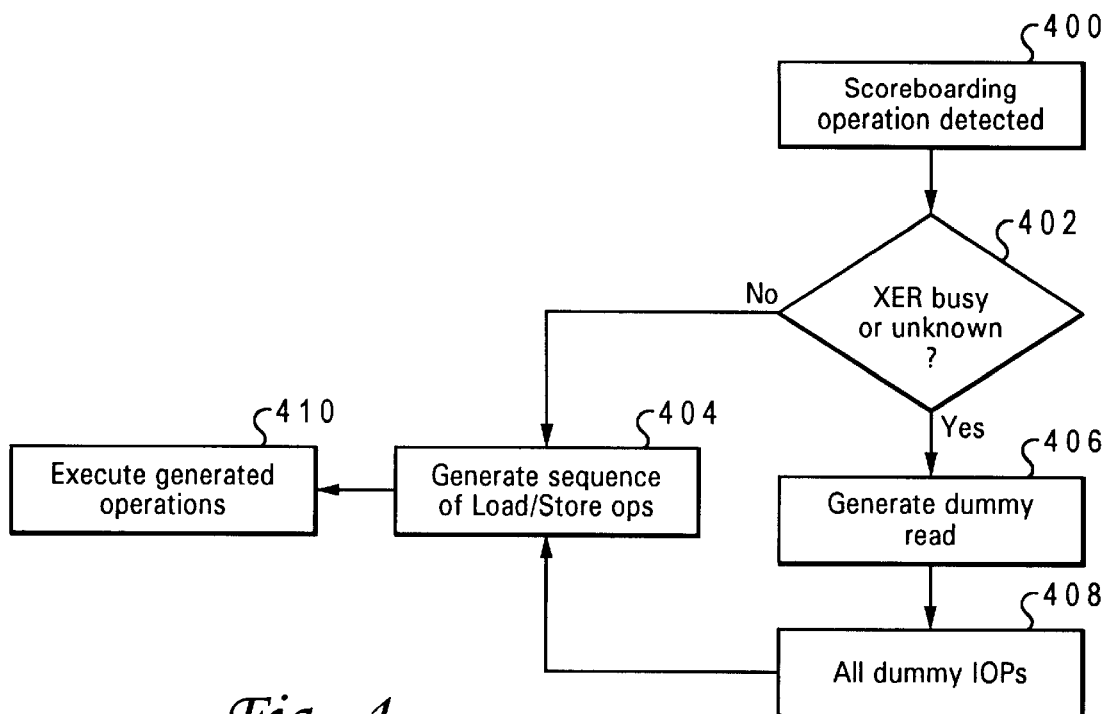
FIG. 4 illustrates a high-level flow diagram of a method for a software based dispatch stall for scoreboard IOPs.

Referring to FIG. 4, a high-level flow diagram of a method for a software based dispatch stall for scoreboard IOPs, is depicted. The process begins with step 400, which depicts an operation, that utilizes a scoreboarded resource, being detected. The process then passes to step 402, which illustrates a determination of whether the XER update is unknown or busy. If XER update is not unknown or not busy, the process passes to step 404, which depicts the state machine of FIG. 3, generating a sequence of loads or stores for a string operation. If the XER update is busy, the process passes instead to step 406, which illustrates generating a dummy read from the XER.

The process then passes to step 408, which depicts dummy IOPs (NOPs) being added to delay completion of the string operation. Next, the process proceeds to step 404, which illustrates generating a sequence of loads or stores for the string operation. The process then continues to step 410, which depicts the generated string operations being executed.

Figure 5:
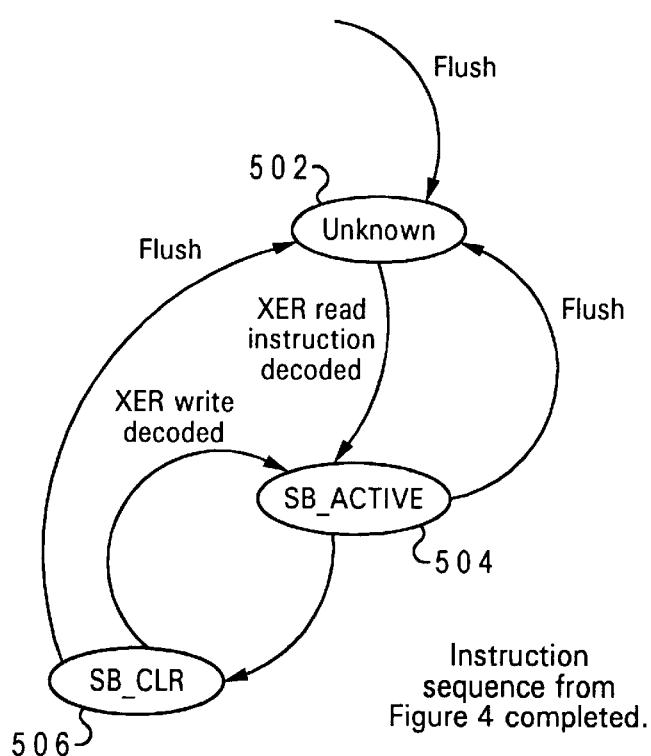
FIG. 5 depicts the state machine of FIG. 3 in an unknown state in accordance with a preferred embodiment of the present invention.

Referring now to FIG. 5, the state machine of FIG. 3 shown is in an unknown state in accordance with a preferred embodiment of the present invention is illustrated. If the state machine is in an unknown scoreboard state 502 and a string operation (XER read) occurs, the internal code sequence will test (read) the XER (IOPs), insert (pad) dummy instructions (IOPs) and perform loads or stores. The state machine will also transition to SB_ACTIVE 504 (scoreboard active state) until the loads or stores are dispatched. At this point the state machine will transition to the scoreboard clear (SB_CLR) state. Subsequent XER read instructions will not require the test and pad IOPs until a flush or XER write instruction is detected.

FIG. 4 and FIG. 5 in combination illustrate the present invention. In summary, an operation that uses a scoreboarded resource is detected. A determination is made whether the XER register of the resource is busy and a state machine generates a sequence of loads and stores if the XER is not busy. If the XER is busy, the state machine generates a dummy read and dummy NOPs for padding the instruction stream, whereupon the state machine then generates the loads or stores. If the state machine in FIG. 5 is in an "unknown" scoreboard state and a string operation (XER read) is present, the resultant internal code sequence will test, pad the string with NOPs and perform the loads and stores. The state machine will also transition to the SB_ACTIVE (Scoreboard active) state until the loads and stores are dispatched. The state machine will then transition to the SB_CLR (scoreboard clear) state.

Figure 6:
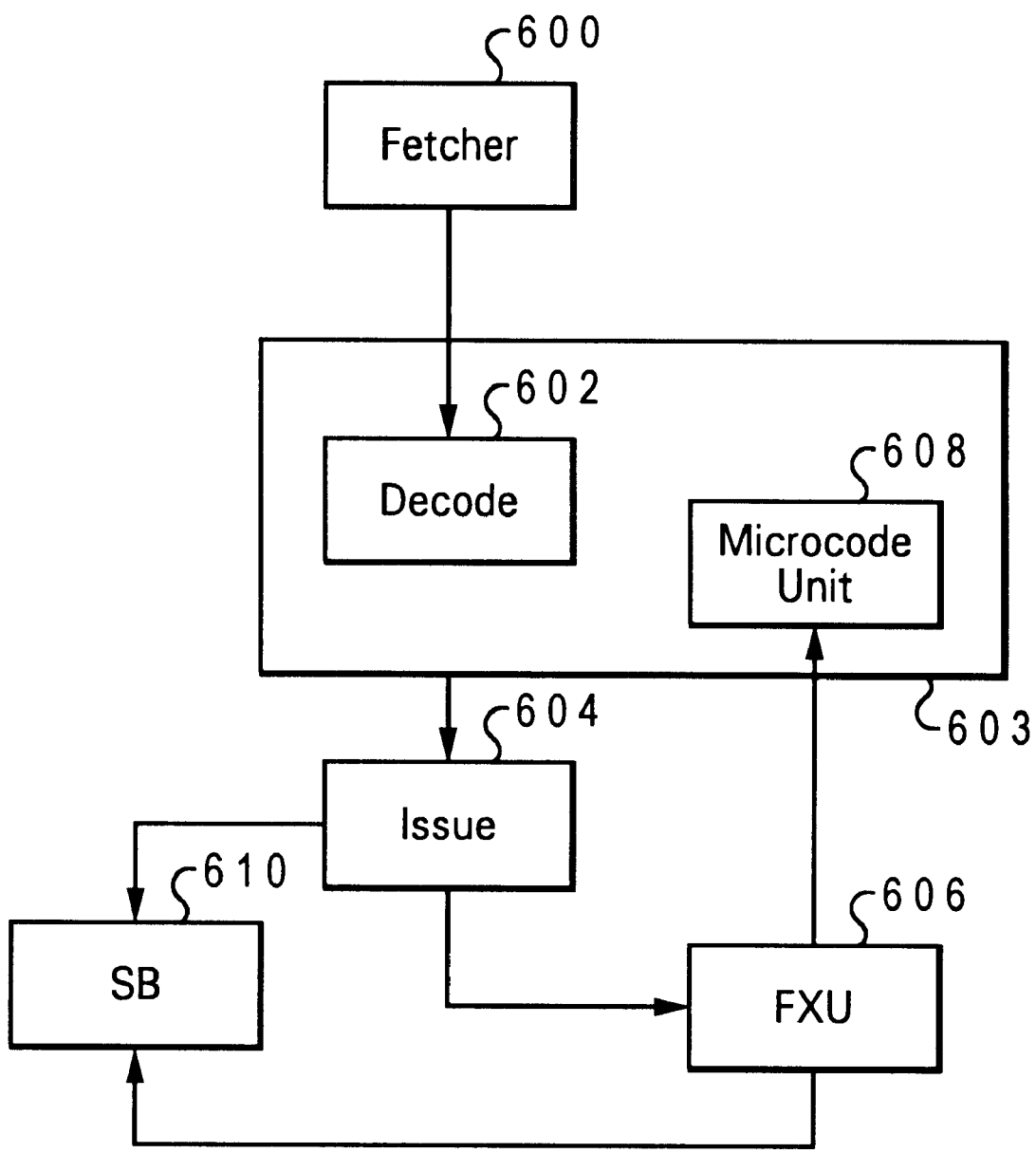
FIG. 6 illustrates instruction flow in accordance with a preferred embodiment of the present invention.

Referring now to FIG. 6, instruction flow in accordance with a preferred embodiment of the present invention, is depicted. The flow begins with fetcher 600 retrieving string instructions. The flow continues with the string instructions entering decode pipeline 602. The string then enters the Instruction sequencer 604 which issues the string received from decode pipeline 602. If the instruction will write the XER, the flow proceeds to set a scoreboard bit 610. Concurrently, the instruction is sent to fixed point execution unit 606 which sends an XER string count to the XER register in dispatch unit 603. As the string count is sent to the XER register, the scoreboard bit 610 is cleared.

NOP IOPs are inserted between the write and read SPR IOPs to allow the ISU scoreboard to be activated before being tested by the second read SPR IOP. A sequence which depends on valid SPR data:

| mfspr | nop | nop | nop |
| mtspr | nop | nop | nop |
| nop | nop | nop | nop |
| nop | nop | nop | nop |
| mfspr | nop | nop | nop. |

A non-functional or "reserve from normal use" SPR, which may be written to and then read from, will implement the same function as inserting the dummy operations (padding the sequence). A sequence that uses a "reserved" SPR address would utilize the following sequence:

| mtspr | nop | nop | nop |
| nop | nop | nop | nop |
| nop | nop | nop | nop |
| mfspr | nop | nop | nop. |

Utilizing an existing ISU scoreboard to confirm XER count, allows utilization of scoreboard controls in a microcode expansion unit without introducing timing problems in critical path circuitry. By issuing dummy instructions to predetermined registers, the pipeline is effectively stalled until a valid XER value is sent to the Instruction Dispatch Unit. X-form string instructions, utilizing the string count field of the XER to determine how many bytes are to be loaded or stored requires the XER to determine the count of generated instructions from microcode (Ucode).

It is important to note that those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. An method for delaying instructions in a processor, comprising the steps of:

utilizing a scoreboard to prevent decoding related instructions that are temporarily separated in a pipeline;

detecting a valid XER value that is sent to an instruction dispatch unit; and responsive to detecting said XER value, including a predetermined number of dummy internal operations with said related instructions.

2. The method of claim 1, further comprising: determining whether a need for said scoreboard exists.

3. The method of claim 1, further comprising:

determining whether an instruction reads a string count field of an XER register;

inserting a dummy read of a string count field if said string count field is read; and writing dummy internal operations between said string count field read and a second string count field read.

4. The method of claim 1, wherein utilizing said existing scoreboard, further comprises:

utilizing instruction sequencer unit scoreboard.

5. The method of claim 3, wherein inserting a dummy read of a string count field, further comprises:

reading said string count field of integer exception register.

6. The method of claim 1, wherein including said predetermined number of dummy internal operations, further comprises:

padding between said related instructions with no operation—internal operations.

7. An apparatus for delaying instructions in a processor, comprising:

an existing scoreboard for preventing decoding of dependent instructions that are temporarily separated in a pipeline;

detection means for detecting a valid XER value that is sent to an instruction dispatch unit; and responsive to detecting said XER value, means for including a predetermined number of dummy internal operations with said related instructions.

8. The apparatus of claim 7, further comprising:

determining whether a need for said scoreboard exists.

9. The apparatus of claim 7, further comprising:

comparison means for determining whether an instruction reads a string count field of an XER register;

logic means for inserting a dummy read of a string count field if said string count field is read; and means for writing dummy internal operations between said string count field read and a second string count field read.

10. The apparatus of claim 7, wherein utilizing said existing scoreboard, further comprises:

utilizing instruction sequencer unit scoreboard.

11. The apparatus of claim 9, wherein inserting a dummy read of a string count field, further comprises:

reading said string count field of integer exception register.

12. The apparatus of claim 7, wherein including said predetermined number of dummy internal operations, further comprises:

padding between said related instructions with no operation—internal operations.

13. A computer program product within a computer usable medium for delaying instructions in a processor, comprising:

instructions within said computer usable medium for utilizing an existing scoreboard for preventing decoding dependent instructions that are temporarily separated in a pipeline;

instructions within said computer usable medium for detecting a valid XER value that is sent to an instruction dispatch unit; and responsive to detecting said XER value, instructions within said computer usable medium for including a predetermined number of dummy internal operations with said related instructions.

14. The computer program product of claim 13, further comprising:

instructions within said computer usable medium for determining whether a need for said scoreboard exists.

15. The computer program product of claim 13, further comprising:

instructions within said computer usable medium for determining whether an instruction reads a string count field of an XER register;

instructions within said computer usable medium for inserting a dummy read of a string count field if said string count field is read; and instructions within said computer usable medium for writing dummy internal operations between said string count field read and a second string count field read.

16. The computer program product of claim 13, wherein utilizing said existing scoreboard, further comprises:

instructions within said computer usable medium for utilizing instruction sequencer unit scoreboard.

17. The computer program product of claim 15, wherein inserting a dummy read of a string count field, further comprises:

instructions within said computer usable medium for reading said string count field of integer exception register.

18. The computer program product of claim 13, wherein including said predetermined number of dummy internal operations, further comprises:

instructions within said computer usable medium for padding between said related instructions with no operation—internal operations.

* * * * *